(12) United States Patent
Drovdahl et al.

(10) Patent No.: US 8,340,637 B2
(45) Date of Patent: Dec. 25, 2012

(54) SECURELY ESTABLISHING PRESENCE ON TELECOMMUNICATION DEVICES

(75) Inventors: Mark Drovdahl, Seattle, WA (US); Paulo Chow, North Bend, WA (US); Sinclair M. Temple, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 13/097,003

(22) Filed: Apr. 28, 2011

(65) Prior Publication Data

US 2011/0269425 A1 Nov. 3, 2011

Related U.S. Application Data

(60) Provisional application No. 61/330,088, filed on Apr. 30, 2010.

(51) Int. Cl.
*H04M 1/66* (2006.01)

(52) U.S. Cl. ........ 455/411; 455/410; 455/417; 455/415; 455/445; 455/552.1

(58) Field of Classification Search ............... 455/404.1, 455/412.1, 414.1, 415, 426.1, 428, 432.2, 455/435.1, 435.2, 445, 552.1, 555, 410, 411, 455/417, 418, 432.1, 553.1, 550.1
See application file for complete search history.

(56) References Cited

U.S. PATENT DOCUMENTS

| | | | |
|---|---|---|---|
| 2004/0200895 A1* | 10/2004 | Boyce et al. | 235/380 |
| 2004/0239498 A1 | 12/2004 | Miller | |
| 2005/0021776 A1* | 1/2005 | Skwarek et al. | 709/228 |
| 2005/0090225 A1 | 4/2005 | Muehleisen et al. | |
| 2006/0084411 A1 | 4/2006 | Lo et al. | |
| 2006/0123454 A1 | 6/2006 | Popa | |
| 2006/0168153 A1 | 7/2006 | Lin | |
| 2006/0168264 A1* | 7/2006 | Baba et al. | 709/230 |
| 2007/0106764 A1 | 5/2007 | Mansfield | |
| 2010/0159898 A1* | 6/2010 | Krzyzanowski et al. | 455/414.1 |
| 2010/0254355 A1* | 10/2010 | Abraham et al. | 370/335 |

OTHER PUBLICATIONS

The PCT Search Report mailed Nov. 29, 2011 for PCT application No. PCT/US11/34494, 8 pages.
The PCT Search Report mailed Nov. 25, 2011 for PCT application No. PCT/US11/34505, 8 pages.

* cited by examiner

*Primary Examiner* — Kathy Wang-Hurst
(74) *Attorney, Agent, or Firm* — Lee & Hayes, PLLC (57) ABSTRACT

In some embodiments, a user may associate a first communication type (e.g., Wi-Fi calling application) with a second communication type (e.g., standard ten-digit mobile telephone number), so that the user may have calls directed to an active communication type in a predetermined preference. In various embodiments, communication devices may become available (e.g., initiated) based on an activity of the user, such as by a location or proximity of the user, use of a device by the user, or for other reasons.

18 Claims, 6 Drawing Sheets

SECURELY ESTABLISHING PRESENCE ON TELECOMMUNICATION DEVICES

CROSS REFERENCE TO RELATED PATENT APPLICATIONS

This patent application claims the benefit and priority to Provisional U.S. Patent Application No. 61/330,088, titled, "Connecting Devices to a Wi-Fi Network with Authentication and Authorization", filed on Apr. 30, 2010, to the same inventors herein, the entire disclosure of which is incorporated by reference herein.

BACKGROUND

Today, people use electronic devices during a continually increasing portion of their day or week. For example, people use mobile telephones to conduct business, personal computers to manage their finances, and media services to receive media for entertainment. Often, the services and functionality of multiple types of communication devices overlap. For example, a person may transmit electronic messages (email) via a mobile telephone, a personal computer, a gaming console, and so forth, when these devices are configured properly. Each of these devices may access unique accounts and/or share access to one or more of the same accounts. Often, people prefer to have access to various communications and data using multiple different devices, thus increasing convenience and accessibility of information.

In telecommunications, people have many choices when conducting voice calls. For example, voice calls may be made over wired telephone lines (i.e., fixed "land-line" calling), over mobile wireless networks (i.e., cellular networks, digital mobile telephone networks), and over the Internet (e.g., voice-over Internet protocol (VoIP), etc.). Some or all of these types of communications may be routed through public switched telephone networks (PSTN), which allow a person to be contacted via an associated address or telephone number. As people begin to use more than one service, coordination and management of the services becomes increasing important.

DESCRIPTION OF DRAWINGS

Non-limiting and non-exhaustive examples are described with reference to the following figures. In the figures, the left-most digit(s) of a reference number identifies the figure in which the reference number first appears. The use of the same reference numbers in different figures indicates similar or identical items or features.

DETAILED DESCRIPTION

As discussed above, people often use multiple electronic devices, which may perform functionality that overlaps with one another. For example, a person may be able to perform a voice communication with a remotely located person via a mobile telephone call and/or a voice-over internet protocol (VoIP) call. The VoIP call may be performed on any electronic device that has connectivity to the Internet, such as a computer, a smart phone (internet enabled and/or Wi-Fi telephone), an internet appliance, a gaming console, a set top box, and so forth.

In some embodiments, a user may associate a first communication type (e.g., Wi-Fi calling application) with a second communication type (e.g., standard ten digit mobile telephone number), so that the user may have calls directed to an active communication type in a predetermined preference. For example, a user may prefer to have calls forwarded from the ten-digit mobile number to a Wi-Fi-based mobile number when the user has the Wi-Fi connection active, or when the Wi-Fi connection becomes active. In various embodiments, communication devices may become available (or unavailable) based on an activity of the user, such as by a location or proximity of the user, use of a device by the user, or for other reasons.

The techniques, apparatus, and/or systems described herein may be implemented in a number of ways. Example implementations are provided below with reference to the following figures.

Illustrative Environment

Figure 1:
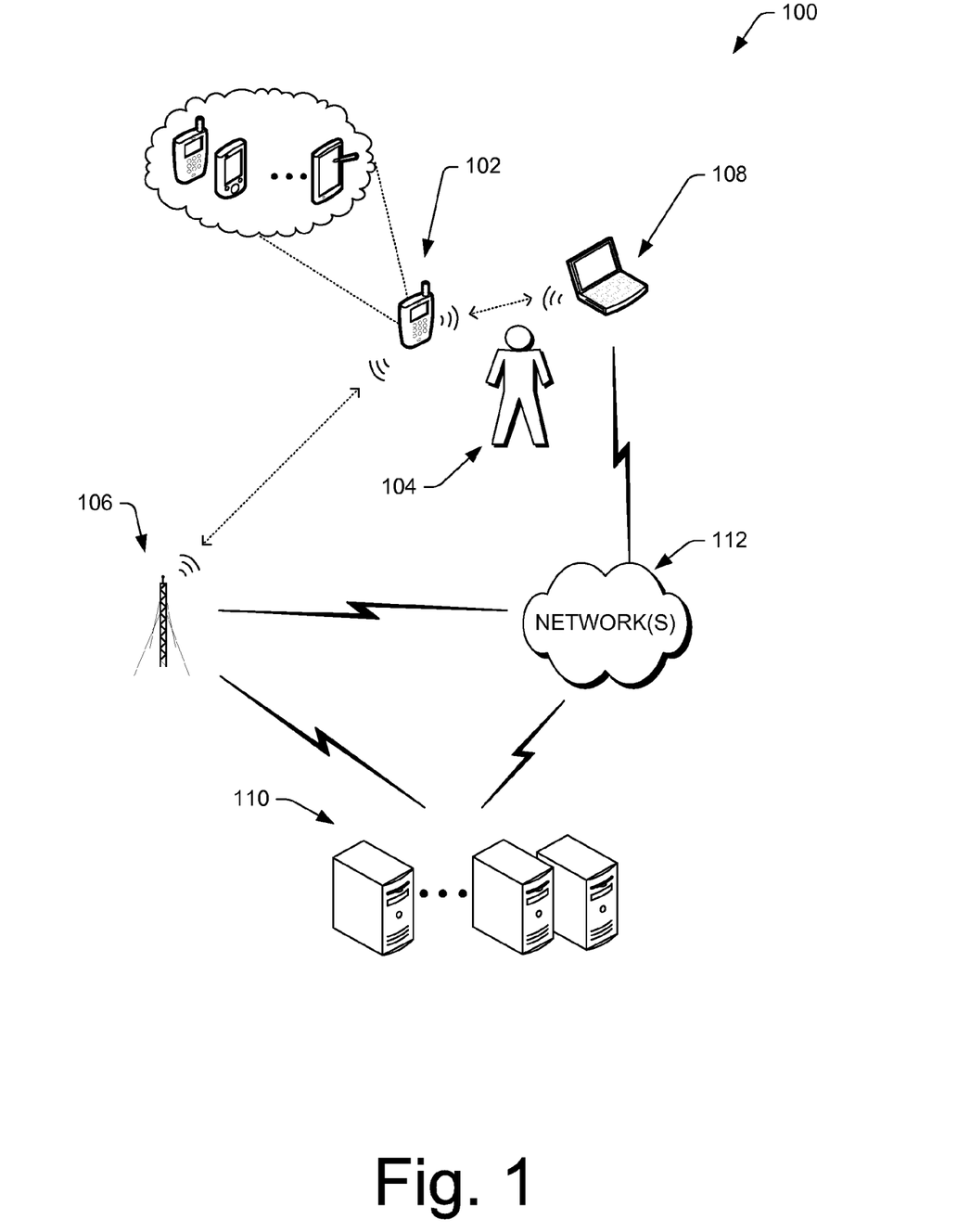
FIG. 1 is an illustrative environment showing Wi-Fi communications.

FIG. 1 is an illustrative environment 100 showing Wi-Fi communications in accordance with various embodiments of the disclosure. The environment 100 includes a telecommunications device 102. The telecommunications device 102 may be a mobile telephone, a smart phone, a netbook, a personal computer, a personal digital assistant (PDA), a tablet computer, a gaming console, or any other electronic device capable of enabling a user to perform voice, data, messaging, and/or Internet communications over a network. A user 104 may use the telecommunications device 102 to place and receive voice communications and/or transmit data, messages, and/or interact with the Internet. The voice communications may be mobile telephone calls routed through a mobile telephone networks 106 (e.g., 2G, 3G, other radio frequency (RF) wireless systems, etc.), Wi-Fi based calls, fixed land-line based calls, or other types of calls.

In some embodiments, the user 104 may employ a computing device 108 to assist (in whole or in part) with voice communications. The computing device 108 may be in communication with servers 110 via one or more network(s) 112. Thus, the computing device 108 may exchange data, such as voice communication data, with the servers 110 to enable voice communications between the user 104 and other users. In addition, the telecommunications device 102 may connect to the servers 110 via the network(s) 112 to exchange data with the servers (e.g., perform voice communications, etc.). In some instances the telecommunications device 102 may communicate with the servers via Wi-Fi communications (via a local access point (AP)), via the mobile telephone network (e.g., 3rd Generation (3G) network, etc.) and so forth.

Once the user 104 establishes a Wi-Fi communication, such as via the telecommunications device 102, the computing device 108, or another device, the user may desire to associate multiple communication processes, devices, and systems for cooperative operation. For example, the user 104 may desire to receive all incoming calls via a Wi-Fi application whenever possible, and thus desire to have calls that are directed to the user's mobile number (PSTN) to be routed to a Wi-Fi calling address, which may also be associated with a PSTN number. Techniques to securely associate various communication processes, devices, and/or systems are described below.

Once associated, calls may be routed to various devices that are associated with each other based on various user-generated or default rules. In some embodiments, a location (proximity) or activity of the user with respect to a telecommunications device may determine a particular routing scheme. For example, when a user is driving his car, calls may be routed to a telecommunication device integrated in the car's computer. Likewise, when the user is within a known Wi-Fi network, calls may be routed to the user's telecommunication device via a Wi-Fi calling application rather than being connected through a standard ten-digit number associated with a mobile telephone or another calling device. For example, when the user is at home and is connected to a known wireless network (e.g., Wi-Fi, Wi-Max, etc.), then calls initially directed to a mobile number may be redirected to the Wi-Fi calling application rather than the standard ten-digit number associated with the mobile telephone.

Illustrative Configuration for Cooperative Operation

Figure 2:
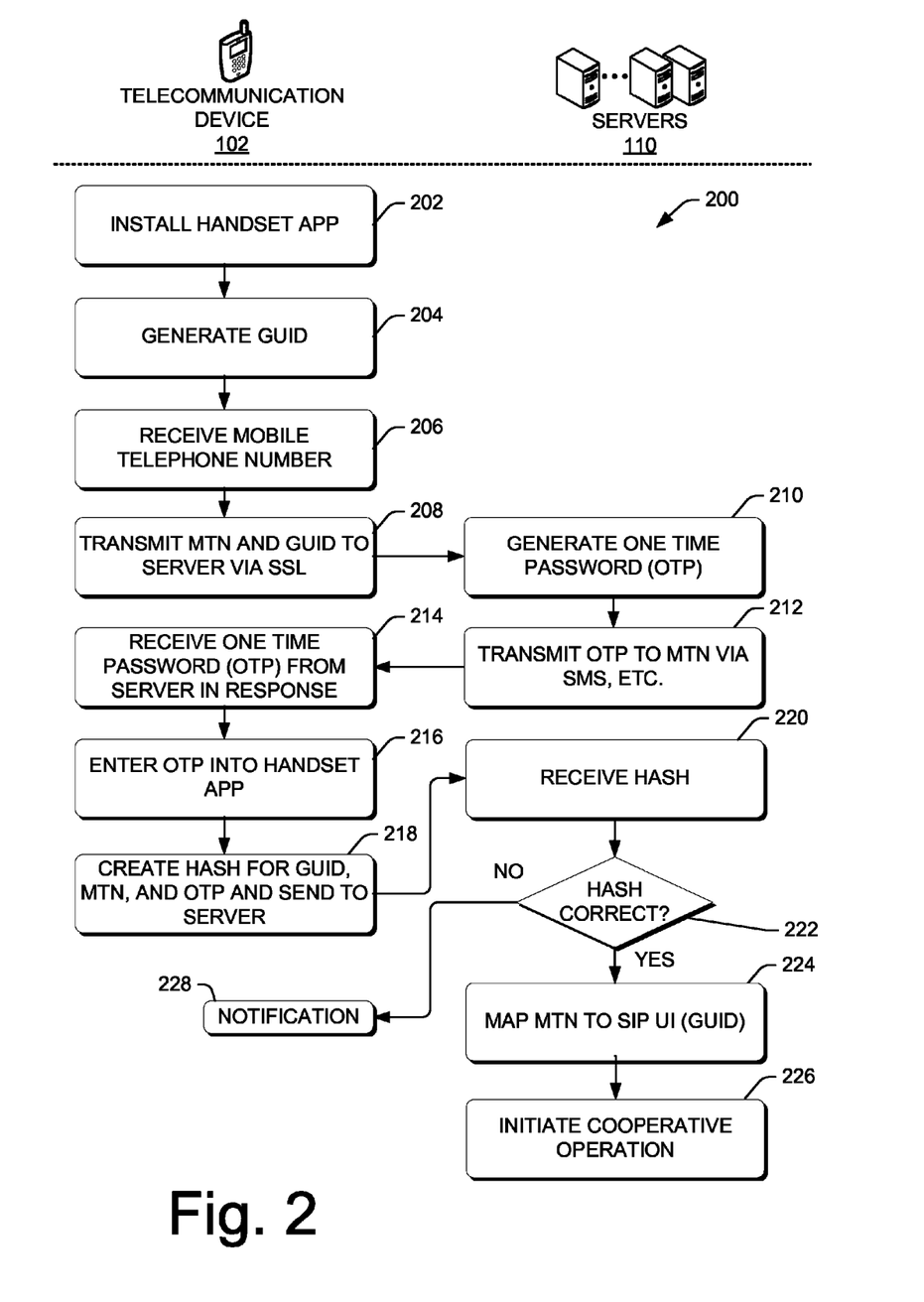
FIG. 2 is a flow diagram of an illustrative process of associating multiple communication devices and systems for cooperative operation.

FIG. 2 is a flow diagram of an illustrative process 200 of associating multiple communication devices and systems for cooperative operation. The process 200 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly.

The process 200 enables a first application, device, and/or communication type to be associated with a second application, device, and/or communication device. For example, the user 104 may use the telecommunications device 102 to place and receive calls via the mobile telephone network 106 and/or via a Wi-Fi calling application. The user 104 may desire to have these two operations work in cooperation such that when the user is active with the Wi-Fi calling application, incoming calls that would normally be connected through the mobile telephone network 106 are automatically routed (i.e., forwarded, directed, etc.) to the Wi-Fi calling application through the network 112. The process 200 provides an illustrative process to configure cooperative operation of telecommunication devices while maintaining security of the user's data (contact information, phone number, etc.).

At 202, a handset application may be installed on the telecommunications device 102 to enable Wi-Fi calling or other types of Internet or network based calls.

At 204, the handset application may generate a globally unique identifier (GUID). The GUID may be used to connect to the handset application, such as by routing a call initiated from another device through the PSTN to the device running the handset application.

At 206, the handset application may request a mobile telephone number (MTN) (or other identifier/address, etc.) to be linked for cooperative operation, such as a ten-digit telephone number used by the PSTN. In some embodiments, the handset application may securely read a mobile subscriber integrated services digital network (MSISDN) and/or an international mobile subscriber identity (IMSI) from a subscriber identity module (SIM) card of the telecommunications device 102.

At 208, the telecommunications device 102 transmits the GUID, the mobile telephone number, and possibly other related information to the server 110 via a secure communication (e.g., secure socket layer (SSL), etc.). For example, the telecommunications device 102 may transmit rules associated with using the GUID (e.g., when in network, between specified times, etc.), contact information such as the user's name and address, payment information, and so forth.

At 210, the servers 110 may receive the data and generate a one time password (OTP).

At 212, the servers 110 may transmit the OTP to the telecommunications device 102 at the mobile telephone number received at 206. The OTP may be transmitted via simple message system (SMS), or by similar means (e.g. automated phone call, etc.). By transmitting the OTP back to the telecommunications device 102, the servers 110 may prove (or verify) ownership and/or control over the telecommunications device 102, and thus authenticate use of this device by the user 104 for the cooperative operation. Similar techniques of authentication may also be used that accomplish the same outcome.

At 214, the telecommunications device 102 receives the OTP from the servers 110 using the mobile telephone number transmitted at the operation 206.

At 216, the OTP is inputted into the handset application (e.g., via a keypad) or otherwise received by the handset application (via memory access).

At 218, the handset application creates an encrypted hash for the GUID, the mobile telephone number (MTN), and the OTP and sends the encrypted hash to the server.

At 220, the servers 110 receive and verify the encrypted hash. At 222, the servers 110 determine whether the encrypted hash is correct (e.g., matches another hash that was previously created by the server using the same or similar information, etc.). When the hash is correct (matches GUID, MTN, OTP, etc.), then the servers 110 map the mobile telephone number to a SIP (Session Initiation Protocol) user identifier at 224 (e.g., the GUID created above) and initiate cooperative operation (e.g., routing, forwarding of calls, rerouting, etc.) at 226. In some embodiments, the cooperative operation may include rules of use, such as conditions under which to forward calls. However if the hash is not correct at 222, the telecommunications device 102 may be notified at 228 and the cooperative operation may not be created. The telecommunications device 102 may also be notified with the cooperative operation is successfully implemented.

After successfully performing the process 200 to initiate cooperative operation at 226, no user input is required on subsequent handset application launches. The servers 110 may automatically recognize the GUID and assume it is coming from the telecommunications device 102 (or another device running the handset application) with the ten-digit phone number (MTN). In some embodiments, the servers 110 and handset application may periodically negotiate new GUIDs on predefined interval for security purposes without any user interaction.

Figure 3:
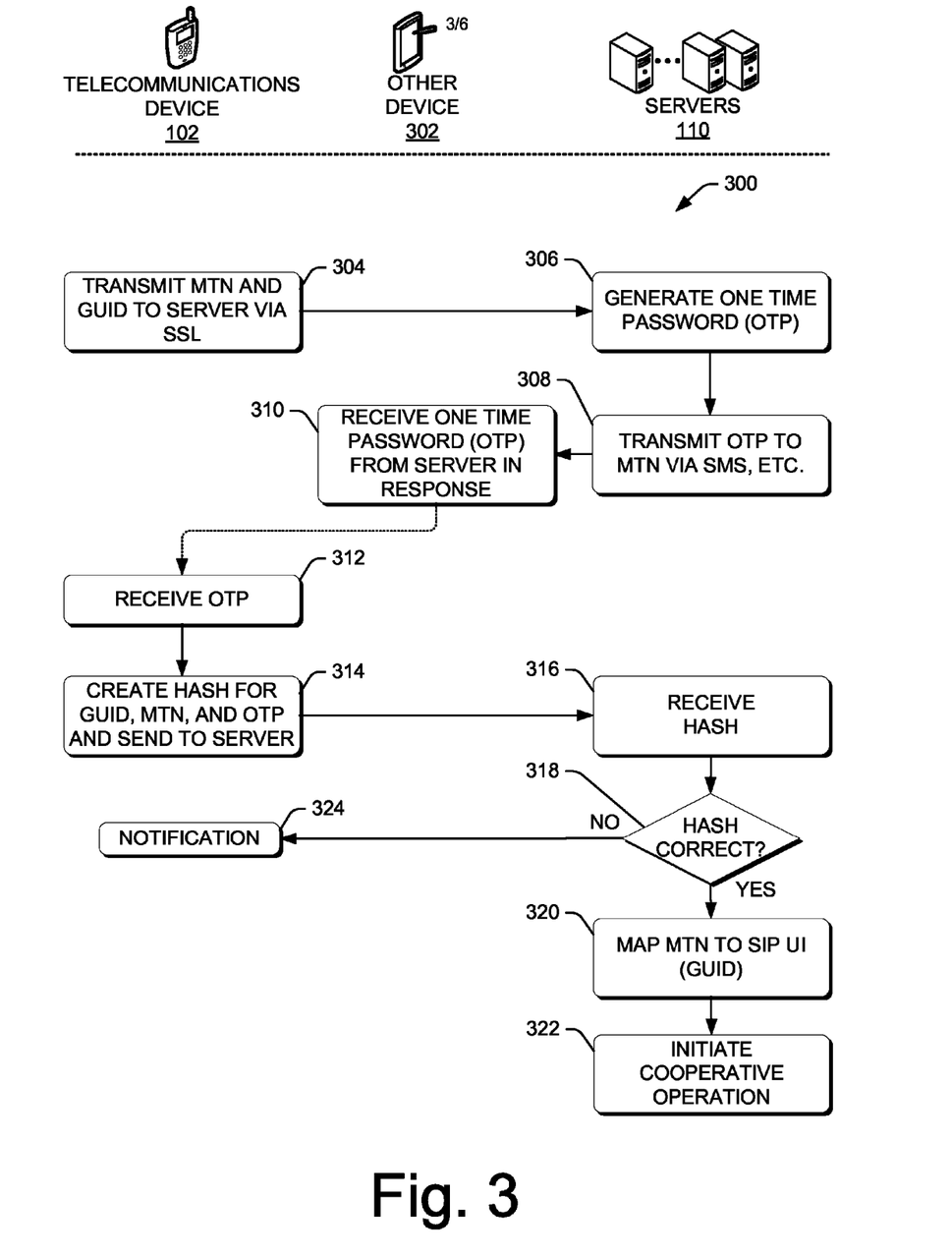
FIG. 3 is a flow diagram of another illustrative process of associating multiple communication devices and systems for cooperative operation.

FIG. 3 shows another illustrative process 300 of associating multiple communication devices and systems for cooperative operation. The process 300 uses another device 302 ("the other device 302"), which includes a GUID that the user 104 desires to associate with the mobile telephone number (MTB) of the telecommunications device 102. The other device 302 may be a telecommunications device similar or identical to the telecommunications device 102. The process 300 is described where the telecommunications device 102 is used in the majority of the exchanges of data with the servers 110, however, in some embodiments, the other device 302 may be used to perform a majority of the operations (e.g., switching the roles of the telecommunication device 102 and the other device 302, switching some operations, etc.).

At 304, the telecommunications device 102 may transmit the GUID, the MTN, and possibly other related information to the server 110 via a secure communication (e.g., secure socket layer (SSL), etc.).

At 306, the servers 110 may receive the data and generate a one time password (OTP).

At 308, the servers 110 may transmit the OTP to the other device 302 at the GUID received at 304.

At 310, the other device 302 may receive the OTP, which may be displayed or otherwise communicated to the user 104 or directly to the telecommunications device 102 via a signal (visual code wired/wireless signal, sound, etc.).

At 312, the telecommunications device 102 may receive the OTP, which was transmitted from the server 110 to the other device 302. The telecommunications device 102 may receive the OTP by an alphanumeric entry by the user 104 or by reading data from the other device 302 (scan code, record sound, receive signal, etc.). By receiving the code at the other device and then transferring the code to the telecommunications device, the user 104 proves possession of both devices and thus a right or authority to associate the GUID and the MTN.

At 314, the handset application creates an encrypted hash for the GUID, the mobile telephone number (MTN), and the OTP and sends the encrypted hash to the server.

At 316, the servers 110 receive and verify the encrypted hash. At 318, the servers 110 determine whether the encrypted hash is correct (e.g., matches another hash that was previously created by the server using the same or similar information, etc.). When the hash is correct (matches GUID, MTN, OTP, etc.), then the servers 110 map the mobile telephone number to a SIP (Session Initiation Protocol) user identifier at 320 (e.g., the GUID created above) and initiate cooperative operation (e.g., routing, forwarding of calls, rerouting, etc.) at 322. In some embodiments, the cooperative operation may include rules of use, such as conditions under which to forward calls. However if the hash is not correct at 318, the telecommunications device 102 may be notified at 324 and the cooperative operation may not be created. The telecommunications device 102 may also be notified with the cooperative operation is successfully implemented.

Figure 4:
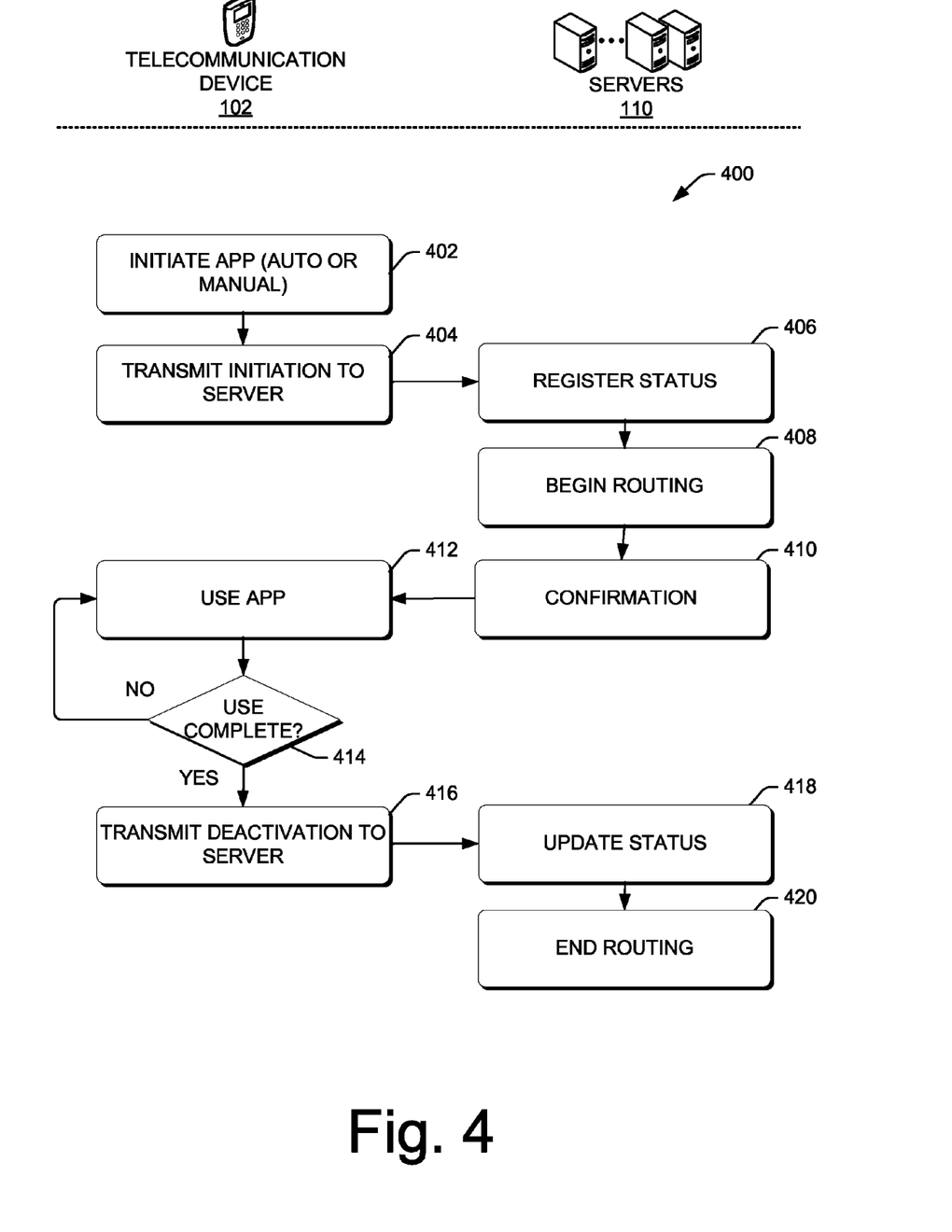
FIG. 4 is a flow diagram of an illustrative process of initiating and deactivating devices for cooperative operation.

FIG. 4 is a flow diagram of an illustrative process 400 of initiating and deactivating telecommunication devices for cooperative operation. The process 400 may enable a determination of which device, application, or communication type is available to the user 102 based on data associated with the user (e.g., proximity location, activation, availability, etc.). The process may also include a protocol for figuring out which device(s) to activate.

At 402, the telecommunications device 102 may initiate a communication application (e.g., the handset application), either automatically or manually. For example, a user may turn on the communication application using a user interface (manual) or the communication application may be turned on by a triggering event (automatic), such as after detection of an available wireless network, during a predetermined time period, during operation, during use by the user 104, proximity of the user (e.g., global positioning system (GPS) indicates the user is in her vehicle, etc.), and/or other events. As discussed in the process 200, the triggers (i.e., rules) may be created by the user and/or may be predefined and communicated to the servers 110 during the process 200 or during a later process to add or update rules.

The communication application may be in the telecommunications device 102, which may be implemented in various different environments. For example, a first telecommunications device may be integrated in the user's vehicle, a second telecommunications device may be integrated in the user's alarm clock, a third telecommunications device may be coupled with a television, and so forth. Each of these respective telecommunications devices may be configured for cooperative operation as discussed above in the process 200.

At 404, the respective telecommunications device (e.g., in the vehicle, alarm clock, the telecommunications device 102, etc.) may transmit an initiation to the servers 110. The initiate may be a registration message to indicate to the servers 110 that the telecommunications device 102 is available to receive calls for the user that are forwarded from a mobile telephone number and directed to the GUID.

At 406, the servers 110 may register the status of the telecommunications device as active. At 408 the servers 110 may begin routing (forwarding) communications to the active device (e.g., voice calls, text messages, etc.). At 410, the servers 110 may transmit a confirmation to the telecommunications device.

At 412, the telecommunications device 102 may use an application to conduct communications. For example, when the user 104 attempts to make an outbound call using the mobile telephone number via the mobile telephone networks 106, the communication application may direct the telecommunications device to use the network 112 to place the call rather than the mobile telephone networks.

At 414, the telecommunications device may determine whether the communication application is to be closed or otherwise deactivated. When use is complete (e.g., the device is turned off, application is closed, rules or triggers are no longer satisfied, etc.), the telecommunications device may transmit a deactivation to the server at 416.

At 418, the server may update the status of the telecommunications device. At 420, the servers may end the routing that was initiated at 408.

In an example implementation, the user may have a mobile telephone number (MTN), a land-line telephone number (LLTN), and various VoIP numbers (GUID, etc.) associated with various telecommunication devices that the user interacts with during the day. When the user drives to work in her car, calls to the MTN or LLTN may be forwarded to the vehicle telecommunication device via the process 400 based on an initiation caused by the use of the vehicle, proximity of the user, or other triggers/rules, etc. When the user parks the vehicle and enters a building for work, the vehicle telecommunications device may be deactivated and calls may then be resumed by other telecommunications devices, such as a mobile telephone with the MTN.

In another example, the telecommunications device 102 may be implemented in an alarm clock. When the user is near the alarm clock (as detected by a proximity detector), during a predetermined period of time, and/or based on other triggers, the alarm clock may be initiated at the operation 402 and operate in accordance with the process 400 until operation is terminated at 416 (e.g., the user leave the proximity, the period of time expires, and so forth).

In still another example, the telecommunications device 102 may be implemented in a television, set-top box, receiver, or other multimedia device. For example, when the user is watching the television, the television may be initiated at the operation 402 and operate in accordance with the process 400 until the cooperative operation is terminated at the operation 416.

In some embodiments, the application 402 may also be initiated when the telecommunication device detects presence of the network 112, such as when the user is home and the telecommunications device logs on to a known network wireless network, such as a local area network (LAN), wide area network (WAN), or other type of network other than the mobile telephone network 106. Thus, when the telecommunications device 102 detects the known network, then the communication application may be initiated at 402. The telecommunications device 102 may operate in accordance with the process 400 until operation is terminated at 416, such as when the telecommunications device 102 is disconnected from the known network or otherwise losses a signal associated with the known network or upon occurrence of another terminating event.

Illustrative Computing Devices

Figure 5:
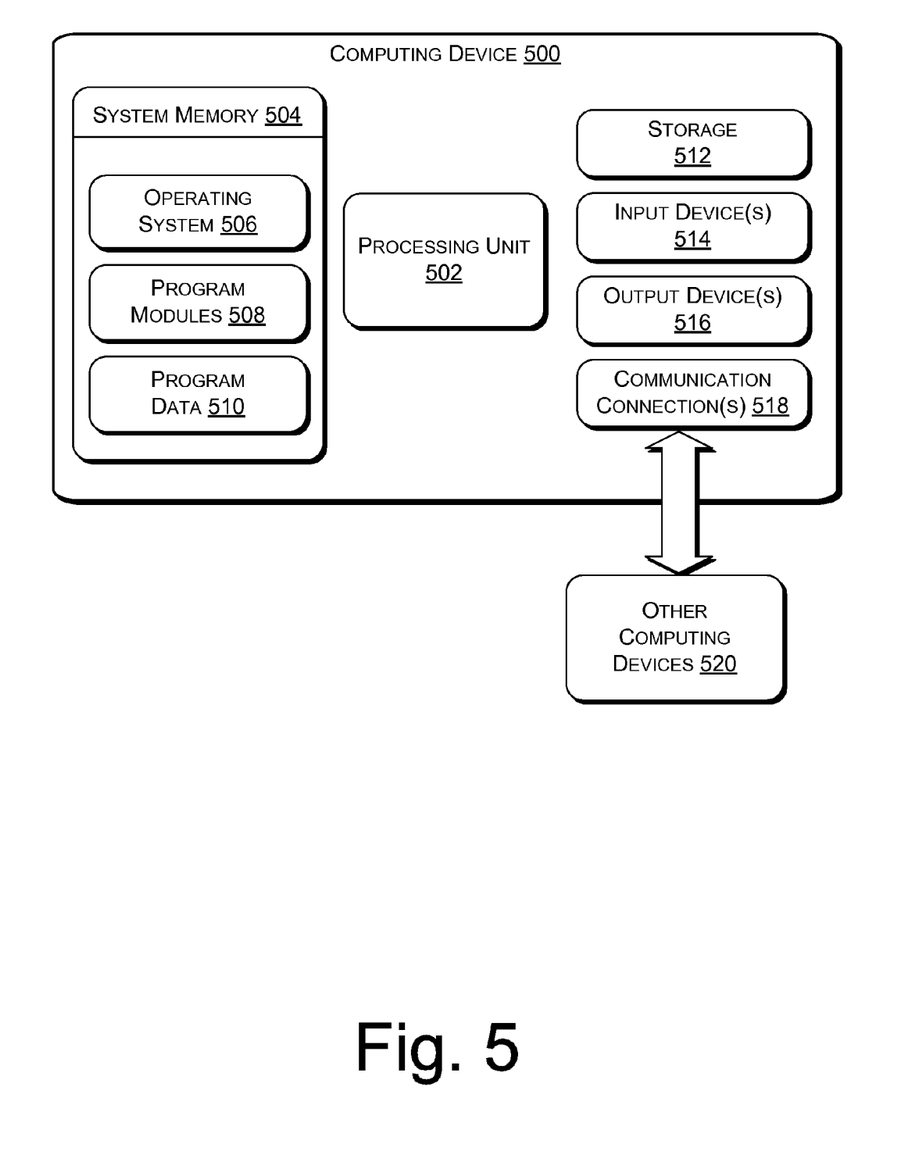
FIG. 5 is a block diagram of an illustrative computing device to enable communication via a secure network.

FIG. 5 is a block diagram of an illustrative computing device to enable communication via a secure network. In various embodiments, computing device 500 (such as the computing device 108) may include at least one processing unit 502 and system memory 504. Depending on the exact configuration and type of computing device, system memory 504 may be volatile (such as RAM), non-volatile (such as ROM, flash memory, etc.) or some combination of the two. System memory 504 may include an operating system 506, one or more program modules 508, and may include program data 510.

Computing device 500 may also include additional data storage devices (removable and/or non-removable) such as, for example, magnetic disks, optical disks, or tape. Such additional storage is illustrated in FIG. 5 by storage 512. Computer storage media may include volatile and nonvolatile, removable and non-removable media implemented in any method or technology for storage of information, such as computer readable instructions, data structures, program modules, or other data. System memory 504 and storage 512 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer-readable storage media may be part of device 500.

In various embodiment, any or all of system memory 504 and storage 512 may store programming instructions which, when executed, implement some or all of the above-described operations of the server 110 and/or the computing device 108.

Computing device 500 may also have input device(s) 514 such as a keyboard, a mouse, a touch-sensitive display, voice input device, etc. Output device(s) 516 such as a display, speakers, a printer, etc. may also be included. These devices are well known in the art and need not be discussed at length here.

Computing device 500 may also contain communication connections 518 that allow the device to communicate with other computing devices 520.

Figure 6:
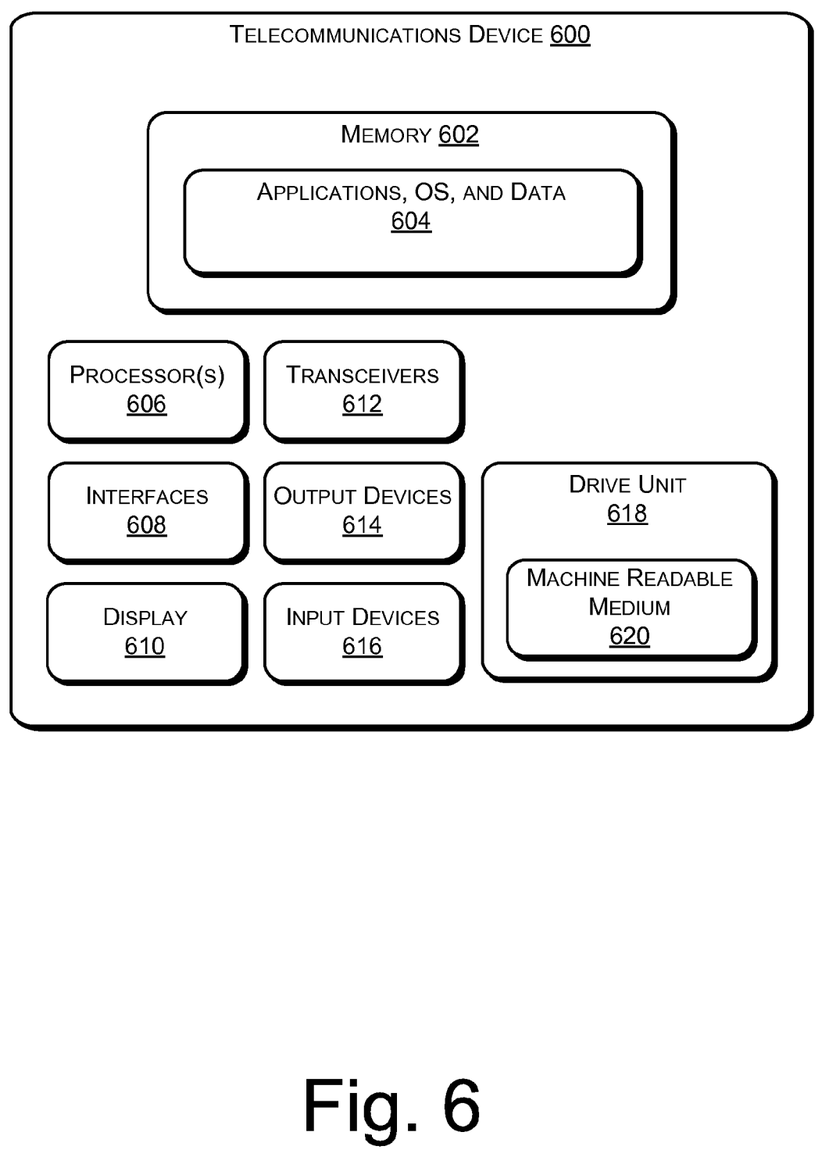
FIG. 6 is a block diagram of an illustrative telecommunications device.

FIG. 6 is a block diagram of an illustrative telecommunications device 600 in accordance with various embodiments. As shown, the telecommunications device 600 (such as the telecommunications device 102) may include a memory 602, the memory storing an application, OS, and data 604. For example, the application or data 604 may include the handset application and/or the communication application discussed with respect to the processes 200 and 300, respectively. The telecommunications device 600 further includes processor(s) 606, interfaces 608, a display 610, transceivers 612, output devices 614, input devices 616, and drive unit 618 including a machine readable medium 620.

In various embodiments, memory 602 generally includes both volatile memory and non-volatile memory (e.g., RAM, ROM, EEPROM, Flash Memory, miniature hard drive, memory card, CD-ROM, digital versatile disks (DVD) or other optical storage, magnetic cassettes, magnetic tape, magnetic disk storage or other magnetic storage devices, or any other medium). Additionally, in some embodiments, memory 602 includes a SIM (subscriber identity module) card, which is a removable memory card used to identify a user of the telecommunications device 600 to a service provider network. Memory 602 can also be described as computer storage media and may include volatile and nonvolatile, removable and non-removable media implemented in any method or technology for storage of information, such as computer readable instructions, data structures, program modules, or other data The applications, OS, and data 604 stored in memory 606 are also shown in FIG. 1 and described above in detail with reference to that figure.

In some embodiments, the processor(s) 606 is a central processing unit (CPU), a graphics processing unit (GPU), or both CPU and GPU, or other processing unit or component known in the art.

In various embodiments, the interfaces 608 are any sort of interfaces known in the art. Interfaces 608 include any one or more of an Ethernet interface, wireless local area network (LAN) interface, a near field interface, a DECT chipset, or an interface for an RJ-11 or RJ-46 port. The a wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. For instance, the telecommunications device 600 can use a Wi-Fi interface to communicate directly with a nearby device. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into telecommunications device 600.

In various embodiments, the display 610 is a liquid crystal display or any other type of display commonly used in telecommunication devices. For example, display 610 may be a touch-sensitive display screen, and can then also act as an input device or keypad, such as for providing a soft-key keyboard, navigation buttons, or the like.

In some embodiments, the transceivers 612 include any sort of transceivers known in the art. For example, transceivers 612 may include a radio transceiver and interface that performs the function of transmitting and receiving radio frequency communications via an antenna. The radio interface facilitates wireless connectivity between the telecommunications device 600 and various cell towers, base stations and/or access points.

In some embodiments, the output devices 614 include any sort of output devices known in the art, such as a display (already described as display 610), speakers, a vibrating mechanism, or a tactile feedback mechanism. Output devices 614 also include ports for one or more peripheral devices, such as headphones, peripheral speakers, or a peripheral display.

In various embodiments, input devices 616 include any sort of input devices known in the art. For example, input devices 616 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 620 stores one or more sets of instructions (e.g., software) embodying any one or more of the methodologies or functions described herein. The instructions may also reside, completely or at least partially, within the memory 602 and within the processor 606 during execution thereof by the telecommunications device 600. The memory 602 and the processor 606 also may constitute machine readable media 620.

CONCLUSION

Although structural features and/or methodological acts are described above, it is to be understood that the appended claims are not necessarily limited to those features or acts. Rather, the features and acts described above are disclosed as example forms of implementing the claims.

What is claimed is:

1. A method comprising:
   receiving a message from a telecommunications device, the message including at least a mobile telephone number and a globally unique identifier (GUID) for the telecommunications device that identify communication paths available for use by the telecommunications device, the message received by a server using a communication path associated with the GUID;
   transmitting a code to the telecommunications device in response to the message using a communication path associated with the mobile telephone number;
   receiving a hash from the telecommunications device that is based at least in part on the code and used to authenticate a relationship between the mobile telephone number and the GUID;
   mapping the mobile telephone number to the GUID when the hash includes the code, the mapping to create a cooperative operation that forwards communications initially directed to the mobile telephone number to be directed to the GUID; and
   terminating the cooperative operation after receipt of a termination request by the telecommunications device to stop forwarding and begin to receive calls for the mobile telephone using the mobile telephone network.

2. The method as recited in claim 1, wherein the message further includes at least one rule that provides conditions which, when satisfied, result in implementation of the cooperative operation.

3. The method as recited in claim 1, further comprising receiving a registration message from the telecommunications device to initiate the cooperative operation.

4. The method as recited in claim 3, further comprising routing calls that are initially directed to the mobile telephone number to be directed to the GUID following a registration of the telecommunications device.

5. The method as recited in claim 3, further comprising transmitting a confirmation to the telecommunications device that the cooperative operation is active.

6. A method, comprising:
   creating a globally unique identifier (GUID) associated with a communication path available by the telecommunications device that is different than a communications path that is associated with a mobile telephone number;
   transmitting a message to a server that includes at least the mobile telephone number and the GUID using the communication path associated with the GUID;
   receiving a code from the server using the communication path associated with the mobile telephone number;
   transmitting a hash to the server that is based at least in part on the code, the mobile telephone number, and the GUID, the hash to authenticate a relationship between the mobile telephone number and the GUID and map, by a server, the mobile telephone number and the GUID to initiate cooperative operation;
   receiving a call directed to the mobile telephone number and forwarded to the GUID based at least in part on the cooperative operation initiated by the server; and
   transmitting a termination message to the server to terminate the cooperative operation and begin using the communication path associated with the mobile telephone number.

7. The method as recited in claim 6, wherein the communication path associated with the GUID is a Voice over Internet Protocol (VoIP) communication path.

8. The method as recited in claim 6, further comprising transmitting a registration message from the telecommunications device to initiate the cooperative operation.

9. The method as recited in claim 8, wherein the transmitting the registration message occurs in response to detecting availability of the communication path associated with the GUID.

10. The method as recited in claim 8, wherein the transmitting the registration message occurs in response to powering on the telecommunications device.

11. The method as recited in claim 8, wherein the transmitting the registration message occurs in response to at least one of a detection of user interaction with the telecommunications device, a predetermined proximity of a user to the telecommunications device, or a predetermined time.

12. The method as recited in claim 6, further comprising receiving a confirmation from the server that the cooperative operation is active.

13. The method as recited in claim 6, further comprising routing calls initiated on the telecommunications device using the communication path associated with the mobile telephone number through the communication path associated with the GUID while the cooperative operation is active.

14. One or more tangible computer-readable storage media storing computer-executable instructions that, when executed on one or more processors, performs acts comprising:
   receiving a message that includes at least a mobile telephone number of a first device and a globally unique identifier (GUID) for a second device, each having a separate communication path available to exchange information with a server, the message received by the server using a communication path associated with the mobile telephone number from the first device;
   transmitting a code to the second device using a communication path associated with the GUID;

receiving a hash from the first device that is based at least in part on the code and used to authenticate a relationship between the mobile telephone number and the GUID; and mapping the mobile telephone number to the GUID when the hash includes the code to create cooperative operation that forwards communications initially directed to the first device to be directed to the second device using the GUID; and terminating the cooperative operation after receipt of a termination request by the first device to stop forwarding and begin to receive calls for the first device using the mobile telephone network.

15. The one or more tangible computer-readable storage media as recited in claim 14, wherein the acts further comprise receiving a registration from the second device to initiate the cooperative operation.

16. The one or more tangible computer-readable storage media as recited in claim 15, wherein the receiving occurs in response to detecting availability of the communication path associated with the GUID.

17. The one or more tangible computer-readable storage media as recited in claim 15, wherein the receiving occurs in response to powering on the second device.

18. The one or more tangible computer-readable storage media as recited in claim 14, wherein the second device at least one of a television, set-top box, audio receiver, or an alarm clock.

* * * * *